United States Patent [19]

Nelson

[11] Patent Number: 5,430,431
[45] Date of Patent: Jul. 4, 1995

[54] VEHICLE PROTECTION SYSTEM AND METHOD

[76] Inventor: Louis J. Nelson, 144-66 175th St., Springfield Gardens, N.Y. 11434

[21] Appl. No.: 184,093

[22] Filed: Jan. 19, 1994

[51] Int. Cl.⁶ .............................................. B60Q 1/00
[52] U.S. Cl. .................................... 340/434; 340/426; 354/75; 358/305
[58] Field of Search ............... 340/426, 541, 434, 545, 340/434; 354/75, 76; 358/310, 335, 305

[56] References Cited

U.S. PATENT DOCUMENTS

| | | | |
|---|---|---|---|
| 3,349,679 | 10/1967 | Lohman, III | 340/545 X |
| 4,789,904 | 12/1988 | Peterson | 358/310 |
| 5,027,104 | 6/1991 | Reid | 340/541 |
| 5,144,661 | 9/1992 | Shamosh et al. | 340/540 X |

*Primary Examiner*—Jeffery A. Hofsass
*Attorney, Agent, or Firm*—Sprung Horn Kramer & Woods

[57] ABSTRACT

A method and system for protecting a vehicle comprises detecting the actuation of the ignition and producing a first signal when actuated, sensing opening and closing of at least one door and for producing a second signal when the passenger door is open, energizing a camera and a recorder in the vehicle when the ignition is actuated and controlling the recorder in response to the first and second signals to record when any door is opened.

12 Claims, 2 Drawing Sheets

VEHICLE PROTECTION SYSTEM AND METHOD

BACKGROUND OF THE INVENTION

The present invention relates to a vehicle protection system and method and in particular to a method and system for preventing robberies.

Robberies of taxicabs and carjackings have become increasingly more prevalent. While many protection methods have been tried, none seem to have effected a reduction in these types of crimes.

These crimes are particularly insidious because they usually involve violence against the driver of the vehicle.

SUMMARY OF THE INVENTION

The main object of the present invention is to provide a vehicle protection system and method which eliminates the disadvantages of the existing systems and methods.

These and other objects and advantages of the present invention are achieved in accordance with the present invention by positioning a video camera in a vehicle to monitor the entire interior of the vehicle including the driver. The camera output is fed into a video recorder that is housed within a safe fire-proof box located somewhere in the vehicle. As long as the engine is on, every time someone opens any door, the camera will turn on and record all activities taking place within the vehicle and will remain on for a predetermined time period, i.e., 15 seconds, after the door is closed.

Should the driver be robbed or killed, the police can access the safe box to review the tape and identify the person or persons who are responsible for the crime.

The present invention will have the effect of reducing these crimes due to the risk to the perpetrator of being identified after the crime has been committed.

The system in accordance with the present invention has means for sensing the opening and closing of each door of the vehicle, means for detecting the starting of the engine resulting from the actuation of the ignition, a video camera and a video tape recorder. A control module mounted within the vehicle receives control signals from the door sensor and the means for detecting the ignition actuation and thereafter controls the camera and recorder. The camera and the recorder are energized by the power supply of the vehicle, i.e., the battery, and are on standby mode.

When any door is opened, the control module commands the video tape recorder to start recording. The camera is preferably a 4 mm wide angle camera which can monitor the entire interior of the vehicle including the driver. The video tape recorder is preferably a VCR with the regular 8 mm format.

In accordance with the present invention, the control module also controls the dome light in the interior so that the dome light is on during the same time that the recorder is recording to provide a good ambient light for the camera.

The control module also preferably receives an input signal from the vehicle alarm system so that the recorder can start recording as soon as the alarm goes off and the alarm signal is produced.

These and other features and advantages of the present invention will become more apparent from the following detailed description of the invention taken with the drawings wherein:

DETAILED DESCRIPTION OF THE INVENTION

Figure 1:
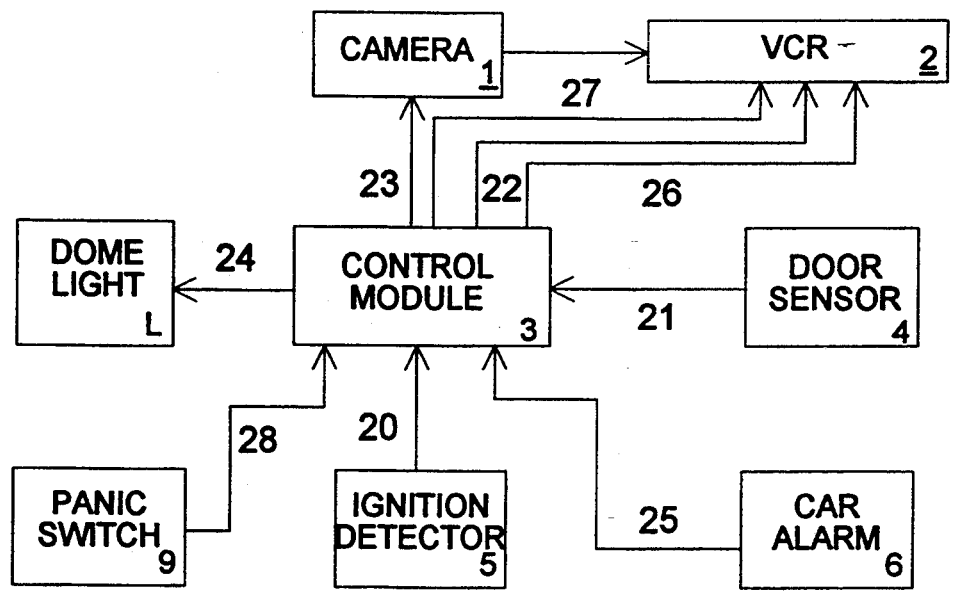
FIG. 1 is a block diagram of the system according to the present invention for carrying out the method according to the present invention.
Figure 2:
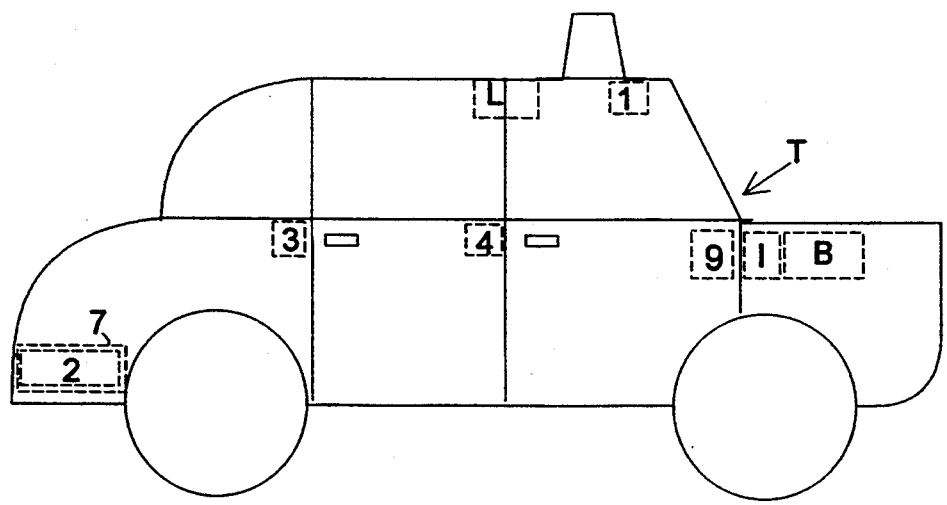
FIG. 2 shows the location of the system in a vehicle.

Referring to FIG. 1 and FIG. 2, when the ignition I is turned on, connecting the battery B in a conventional manner, this state is picked up by detector 5 which generates a signal 20, the waveform for which is illustrated in FIG. 3A. The detector can be a 12 volt sensing relay model RG2-11AD10-12 by NTE Electronics, Inc. of New Jersey.

As soon as the ignition is on, signals 22 and 23 are generated to energize camera 1 and VCR 2. Signals 22 and 23 are shown in FIGS. 3B and 3C respectively.

The entire system is on standby at this time awaiting the opening of any door of the vehicle. When any door is opened, and in particular a passenger door, sensor 4, which can be a microswitch as is normally provided in car doors for turning on the interior lights, produces signal 21 which is applied to the control module 3. Signal 21 is shown as waveform 3D in FIG. 3.

The control module 3, upon receiving signals 20 and 21, produces signal 24 which turns on the dome light L. The waveform for signal 24 is shown as FIG. 3E.

The control module 3 also produces signal 26 which is applied to the VCR and which controls the VCR to start recording. The signal 27, which is the inverse of signal 26, controls the pause control of the recorder 2. Signals 26 and 27 have their waveforms shown in FIGS. 3F and 3G respectively.

When the door is closed, the control module maintains the dome light and recorder on for a predetermined time period, preferably 15 seconds before turning off the dome light and pausing the recorder.

If the vehicle has an optional car alarm 6, the alarm produces a signal 25 when the alarm goes off. Control module 3 receives signal 25 which acts the same way as the door open signal 21 to turn the dome light on and to start recording on the recorder 2.

The system also has a panic switch 9 mounted on the dashboard of the vehicle and which produces a signal 28 which simulates the door being opened and thus turns on the VCR when the ignition is on.

The recorder 2 is preferably stored in a safe 7 which is fire-proof and which can only be opened by a key or combination lock. The recorder is preferably stored in a place such as the trunk of the vehicle T shown in FIG. 2 so that it is inaccessible to unauthorized persons. The control module 3 is also preferably located out of the reach of unauthorized persons, i.e., under the rear package shelf. The camera 1 is preferably disposed close to the front window of the vehicle so as to be able to view all of the passengers and the driver.

The camera is preferably a pencil type camera such as model CCD-100E made by GBC, Inc. of New York, N.Y.

Figure 3:
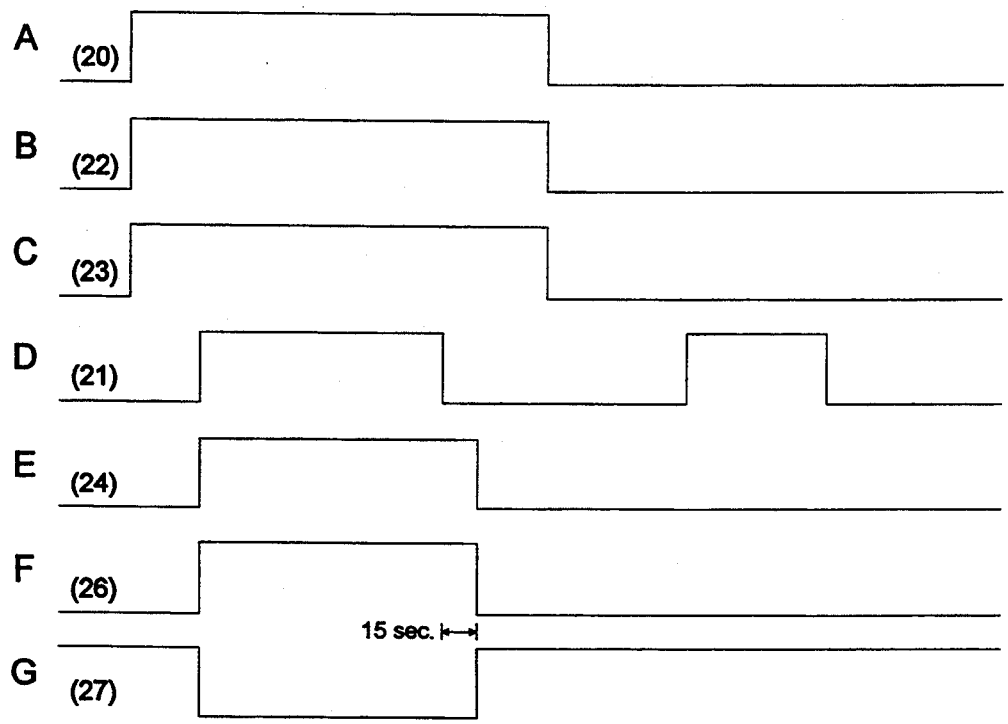
FIG. 3 is a timing diagram of the signals produced by the devices in FIG. 1.
Figure 4:
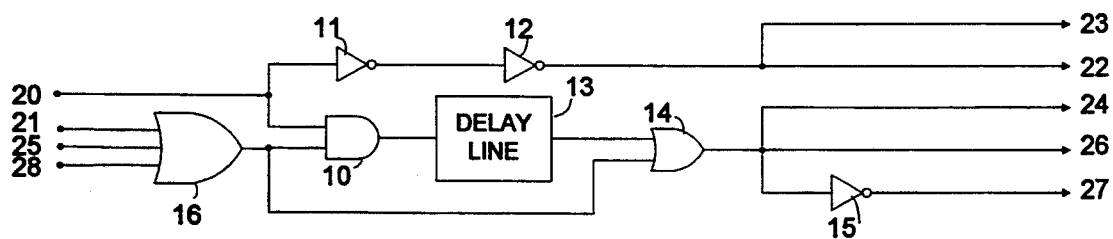
FIG. 4 is a circuit diagram of the control module of FIG. 1.

FIG. 4 illustrates the circuitry of the control module 3 which produces the waveforms of FIG. 3. As shown in FIG. 4, signals 21, 25 and 28 are applied to the input to the three input OR-gate 16, the output of which forms one input of a two input AND-gate 10. The other input of gate 10 is signal 20 which is also applied to the input of inverter 11. The output of inverter 11 is applied to another inverter 12 to produce signals 22 and 23. The output of AND-gate 10 is applied to a fifteen second delay line 13. The output of delay line 13 is applied along with the original output of AND-gate 10 to OR-gate 14 to produce the signals 24 and 26. The output of OR-gate 14 is also applied to inverter 15 to produce signal 27. The behavior of the signals is as shown in FIGS. 3A–3G.

It is understood that the embodiments described hereinabove are merely illustrative and are not intended to limit the scope of the invention. It is realized that various changes, alterations, rearrangements and modifications can be made by those skilled in the art without substantially departing from the spirit and scope of the present invention.

What is claimed is:

1. A vehicle protection system for a vehicle having at least one passenger door providing entry to an interior of the vehicle and an ignition which is turned on during use of the vehicle, the system comprising: means for detecting the turning on of the ignition for producing a first signal; means for sensing opening and closing of the at least one passenger door and for producing a second signal for the duration of an interval when the at least one passenger door is open; an energizable video camera mountable in the interior of the vehicle for focussing on passengers entering the vehicle through the at least one passenger door; an energizable and controllable video tape recorder connected to the camera for recording images of entering passengers; control means receptive of the first and second signals for energizing the camera and the recorder when the ignition is turned on and for controlling the recorder to record when a source of electricity is actuated and the at least one passenger door is open.

2. The system according to claim 1, wherein the vehicle has a dome light in the interior and the control means has means for producing a third signal in response to the first and second signals for turning on the dome light when the at least one passenger door is open and for a predetermined time delay period after the at least one passenger door is closed and for controlling the recorder to record while the at least one passenger door is open and for the predetermined time delay period after the at least one passenger door closes.

3. The system according to claim 2, wherein the control means further comprises means for controlling the recorder to pause after the predetermined time delay period.

4. The system according to claim 2 wherein the vehicle has a panic button in the interior which produce a panic signal when actuated and wherein the control means comprises means receptive of the panic signal for producing the third signal when the ignition is turned on to turn on the dome light and begin recording as if the at least one passenger door had been opened for the duration of the actuation of the panic button.

5. The system according to claim 2, wherein the vehicle includes an alarm system which produces an alarm signal when activated and wherein the control means has means receptive of the alarm signal when the ignition is turned on for producing the third signal to turn on the dome light and begin recording as if the at least one passenger door had been opened for the duration of the activation of the alarm system.

6. The system according to claim 1, further comprising a fire-proof safe for housing said recorder in the vehicle.

7. A method for protecting a vehicle having at least one passenger door providing entry to an interior of the vehicle and an ignition which is turned on during use of the vehicle, the method comprising the steps of detecting the turning on of the ignition and producing a first signal; sensing opening and closing of the at least one passenger door and for producing a second signal for the duration of an interval when the at least one passenger door is open; mounting an energizable video camera in the interior of the vehicle and focussing on passengers entering the vehicle through the at least one passenger door; connecting an energizable and controllable video tape recorder to the camera for recording images of entering passengers; energizing the camera and the recorder when the ignition is turned on and controlling the recorder in response to the first and second signals to record when a source of electricity is actuated and the at least one passenger door is open.

8. The method according to claim 7, wherein the vehicle has a done light in the interior and the step of controlling the recorder comprises producing a third signal in response to the first and second signals to turn on the dome light when the at least one passenger door is open and for a predetermined time delay period after the at least one passenger door is closed and for recording while the at least one passenger door is open and for the predetermined time delay period after the at least one passenger door closes.

9. The method according to claim 8, further comprising pausing recording after the predetermined time delay period.

10. The method according to claim 8, wherein the vehicle has a panic button in the interior which produces a panic signal when actuated and further comprising producing the third signal when the ignition is turned on to turn on the dome light and begin recording as if the at least one passenger door had been opened for the duration of the actuation of the panic button.

11. The method according to claim 8, wherein the vehicle includes an alarm system which produce an alarm signal when activated and further producing the third signal when the ignition is turned and the alarm signal is received to turn the dome light and begin recording as if the at least one passenger door had been opened for the duration of the activation of the alarm system.

12. The method according to claim 7, further comprising housing the recorder in a fire-proof safe in the vehicle.

* * * * *